No. 692,355. Patented Feb. 4, 1902.
A. W. ROBERTSON.
APPARATUS FOR LOADING OR UNLOADING BULK CARGOES.
(Application filed Sept. 20, 1901.)

(No Model.) 3 Sheets—Sheet 2.

Witnesses,
Q. Gerlacht, Jr.
W. H. Pumphrey.

Inventor,
Alexander W. Robertson
by A. Parker Smith
his Attorney.

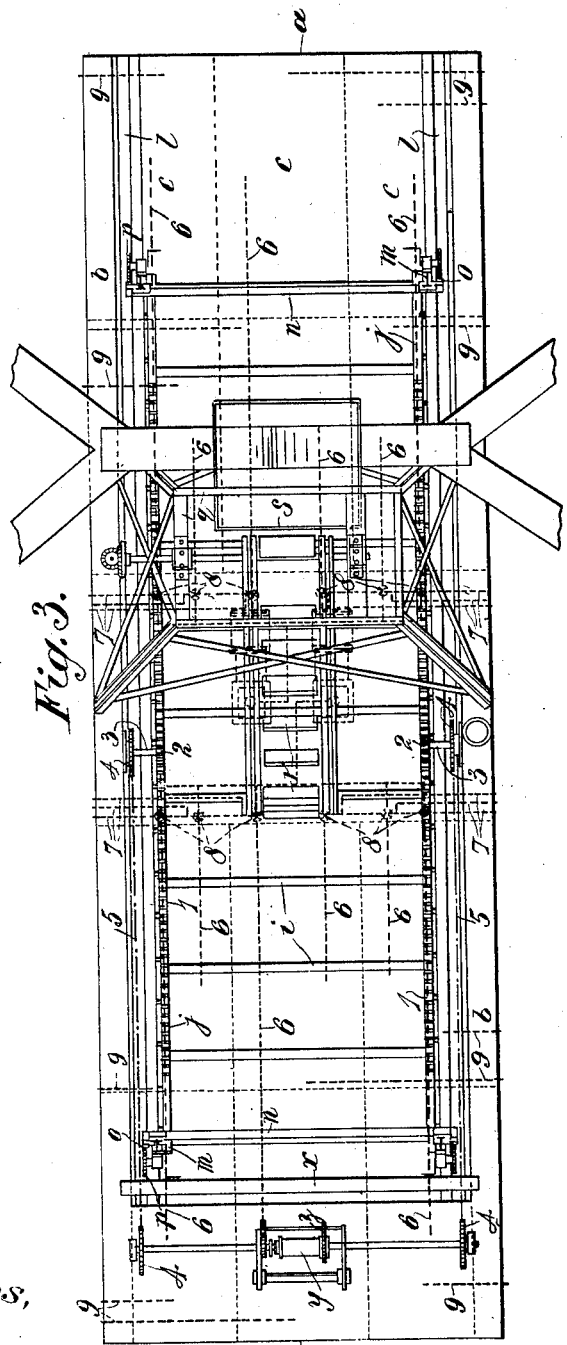

UNITED STATES PATENT OFFICE.

ALEXANDER WINTON ROBERTSON, OF LONDON, ENGLAND.

APPARATUS FOR LOADING OR UNLOADING BULK CARGOES.

SPECIFICATION forming part of Letters Patent No. 692,355, dated February 4, 1902.

Application filed September 20, 1901. Serial No. 75,863. (No model.)

*To all whom it may concern:*

Be it known that I, ALEXANDER WINTON ROBERTSON, a subject of the King of Great Britain and Ireland, residing in the city of London, England, have invented Improvements in Apparatus for Loading or Discharging Coal, Grain, and other Substances in Bulk into and from Barges, Floats, and Like Vessels, of which the following is a specification.

This invention has for its object to facilitate the loading and unloading of coal, grain, and other substances in bulk into and from barges, floats, lighters, and like vessels. For this purpose the vessel which is to be loaded or unloaded is secured upon a carriage which is able to travel in suitable ways formed in a pontoon or floating dock which is furthermore provided with means for delivering coal or other substances into or removing same from a vessel so secured, the arrangement being such that as the loading or unloading proceeds the carriage, with the vessel secured to it, can be by appropriate means moved as required to bring different parts of the said vessel successively into loading or unloading position relatively to the loading or discharging appliance or appliances, which may be of any suitable construction—such, for example, as of the ladder or bucket elevator or like type—and the pontoon or floating dock being constructed with ballast tanks or compartments so disposed that by the admission or discharge of water from one or more of them any tendency of the pontoon or floating dock to list or heel or incline forward or aft caused by the load in the barge or like vessel becoming unevenly distributed therein or otherwise may be readily counteracted.

This invention may be carried out in various ways. One arrangement is illustrated, by way of example, in the accompanying drawings, in which—

Figure 1:
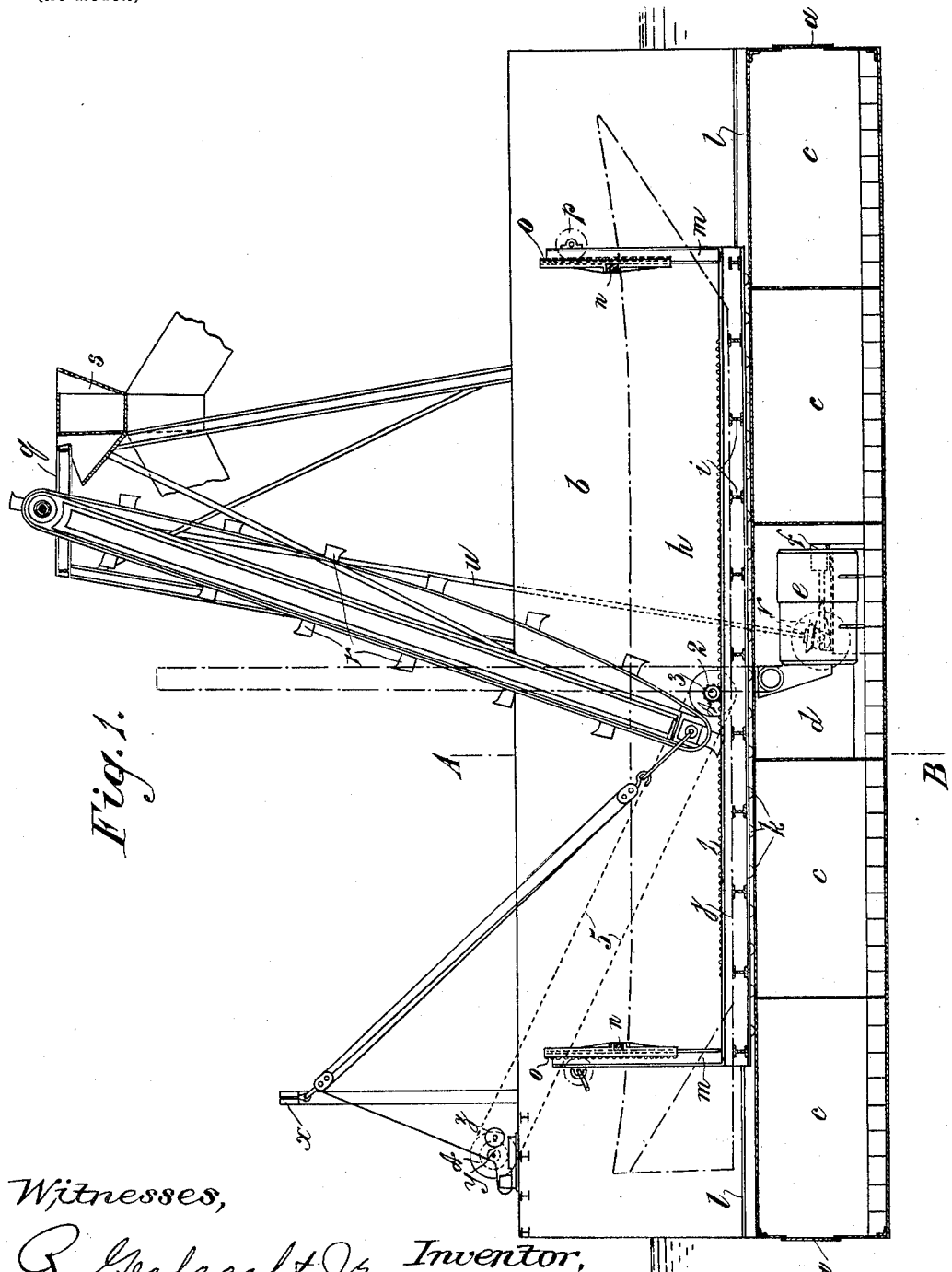
Figure 2:
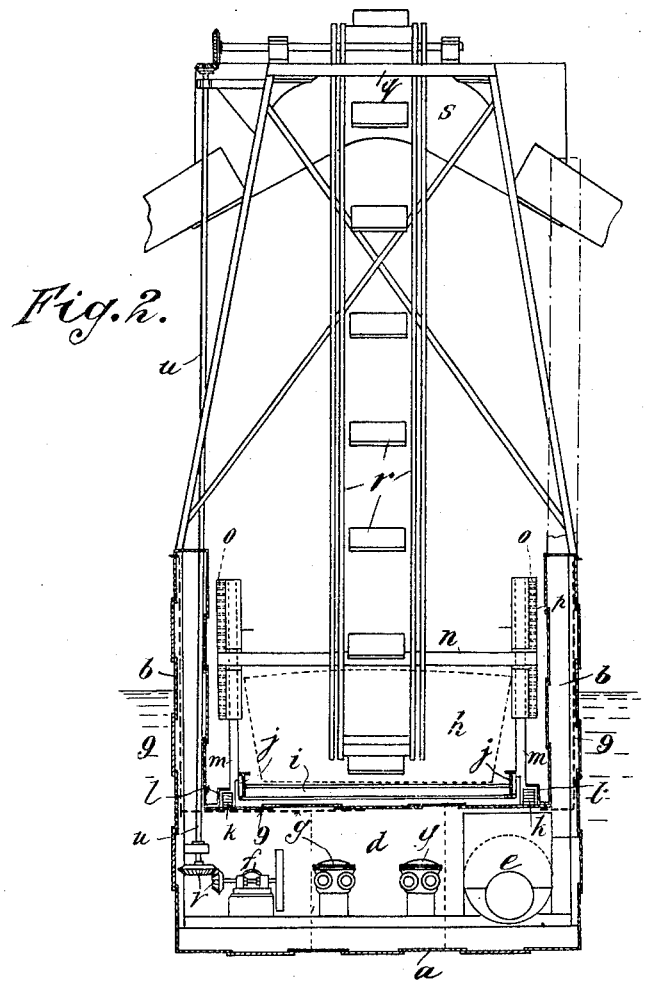

Figure 1 is a sectional elevation showing the pontoon, carriage, and elevator-gear; Fig. 2, a cross-section on the line A·B of Fig. 1, and Fig. 3 a plan.

$a$ is the pontoon or floating dock, which is open at both ends, the side walls being formed by the air-chambers $b$, necessary for the flotation of the pontoon at various depths.

$c$ $c$ are the water-tight ballast tanks or compartments, which are formed beneath the floor of the pontoon at or toward each end thereof. Conveniently there may be two cross-rows of tanks or compartments $c$ toward each end of the pontoon, as shown, three tanks or compartments being arranged in each row; but obviously there may be only one row or more than two rows of tanks or compartments toward each end of the pontoon, and the number of tanks in each row may be more or less than three, according to requirement.

$d$ is an amidships chamber or compartment in which is situated the motive-power apparatus—for instance, a steam-boiler $e$ and engine $f$ and the pumps $g$, valves, or other machinery necessary for controlling the charging and discharging of water into and from the several ballast-tanks $c$. One or more passages and hatchways are provided through the air-tight flotation-chambers to enable a person to enter and leave the amidships compartment and for the ventilation of the same.

$h$ is the barge or float, and $i$ the carriage which receives and holds it. The latter is arranged to travel longitudinally of the pontoon and is actuated by motive power, as hereinafter described. The carriage $i$ comprises a horizontal frame or skeleton platform $j$, which is provided at each side with wheels or rollers $k$, which normally rest upon the floor of the pontoon or upon rails thereon and extend beneath the flanges of girders $l$, secured to the floor, so that the carriage cannot be raised relatively to the pontoon as the barge or float secured to it is lightened. At or near each end of the carriage are fixed uprights or standards $m$, which support movable cross-beams or girders $n$, capable of being lowered, so as to clamp the barge or float $h$ to the carriage.

$o$ $o$ are racks secured to the cross-girders $n$, and $p$ $p$ are pinions mounted on the uprights or standards $m$ and adapted to be worked by hand-cranks, so as to actuate said beams or girders $n$. The pinions $p$ engaging the racks $o$ of each girder may be geared together and may be driven by other suitable motive-power apparatus.

$q$ is a transverse gauntree mounted on supports secured to the side air-chambers $b$ of the pontoon, and the head of a ladder-elevator $r$ is pivoted to the said gauntree, which also has secured to it a hopper $s$, into which the coal or other substance is tipped from the buckets of the elevator $r$. This hopper is fitted on one or each side with any number of adjustable distributing-chutes, so as to discharge the coal or other substance onto other chutes, belts, or other conveyers or otherwise, whereby it is distributed to the desired places or stations on board ship or ashore.

The elevator-gear is driven from the engine or motor $f$, situated in the amidships compartment $d$, through suitable gearing, which may conveniently comprise an approximately vertical shaft $u$, geared at its foot to the motor-shaft through bevel or other gearwheels $v$ and at the top to the shaft to which the upper sprocket-wheel or tumbler of the elevator-chain is secured. The elevator may be driven from the motor $f$ by chain and sprocket-wheels, if desired.

$x$ is a derrick arranged at or near one end of the pontoon and fitted with blocks and falls for raising and lowering the foot of the elevator-ladder $r$, the said blocks and falls being worked by a suitably-driven winch $y$ and situated at or near the end of the pontoon $a$ upon a platform between the air-chambers $c$. By means of suitable gearing $z$ and clutches this winch may be adapted to also actuate the gear for working the carriage $i$. In the example illustrated the carriage is formed with racks 1, into which gear pinions 2, fixed to short shafts 3, mounted in suitable bearings secured to the pontoon, said shafts being driven through sprocket-wheels 4 and chains 5. There are two pumps $g$ shown on the drawings, one adapted to discharge into the tanks or compartments $c$ at one end of the pontoon and the other into those at the other.

6 6 are pipes leading from the pumps to the tanks or compartments, and 7 7 are branches from the pipes 6, leading to the exterior of the pontoon below the water-level.

8 8 are three-way valves by which each tank or compartment can be put in communication with the pumps or with the sea, according to whether it is desired to discharge water therefrom or to admit water thereto.

9 9 are air-pipes leading from the several tanks to above the water-level.

With such an arrangement, the pontoon $a$ having been sunk to a suitable depth, the carriage $i$ is run out by rotating the pinions 2 in the required direction, so as to pass beneath a floating barge or float $h$. The cross beams or girders $n$ are then lowered by means of the racks $o$ and pinions $p$ and secured so as to clamp the barge or float to the carriage. The foot of the elevator $r$ is then lowered into the one end of the hold of the barge or float $h$, and the person in charge of the pumps and valves then admits water to or discharges water from such of the ballast tanks or compartments $c$ as may be necessary to bring the pontoon into position and to the required level to enable the elevator-chutes to deliver at the desired points. As the elevator discharges grain or other material from the barge or float $h$ the latter is gradually advanced along the pontoon $a$ by traversing its carriage $i$ toward the elevator $r$, any tendency of the pontoon to tilt forward or aft or to list by reason of the lightening of one end or portion of the barge or float $h$ being counteracted by admitting water to the corresponding ballast tank or tanks or compartment or compartments $c$. Suitable level-indicators may be provided in the amidships compartment $d$ to enable the person there who is in charge of the machinery to maintain the level of the barge without directions from outside.

In some cases wings or inclined boards may be arranged at the sides of the elevator, so as to guide the coal, grain, or other substance toward the foot of the elevator.

The elevator may be made adjustable as regards height, so as to avoid the raising of the coal or other substance to a greater height than is necessary when delivering into vessels of low freeboard or otherwise. For this purpose the gear-wheel at the top of the vertical driving-shaft $u$ of the elevator may be arranged to slide on its shaft, to which it is connected by a feather and groove, and the gear at the head of the elevator to be lowered, a number of links and buckets being removable. When chain-gear is employed, a suitable number of links are removed from the chain.

Sometimes elevators (including ladders, buckets, chains, and all gear and machinery attached thereto) may be arranged to work athwartships the pontoon instead of longitudinally thereof, as just described.

A similar arrangement of pontoon, carriage, and elevator may be employed for unloading substances in bulk from ships and discharging into barges or floats, the elevator for unloading ships in such a case being arranged at one side of the pontoon. In some cases such an arrangement of pontoon with carriage may be provided with two or more elevators arranged athwartships, one or some of which are designed for loading barges or floats from a ship and the other or others for loading a ship from barges or floats, the elevator for these two purposes being preferably arranged upon opposite sides of the pontoon.

Apparatus constructed according to this invention is capable of economically and rapidly transferring coal, grain, and other bulk cargoes from and into a succession of barges, floats, and like vessels of ordinary construction.

What I claim is—

1. The combination with a pontoon of a movable carriage secured thereto, means for securing a floating vessel to said carriage and means for transferring the bulk cargoes of said floating vessel, as set forth.

2. The combination with a pontoon of means for preventing a floating vessel rising or sinking relatively thereto, means for transferring the bulk cargoes of said vessel and ballast-tanks, as set forth.

3. The combination with a pontoon of a movable carriage secured thereto, means for securing a floating vessel to said carriage, means for transferring the bulk cargoes of said vessel, and ballast-tanks, as set forth.

4. The combination with a pontoon of a movable carriage, standards fixed to said carriage, movable cross-beams carried by said standards, and means for raising and lowering said beams, as set forth.

5. The combination with a pontoon of a movable carriage, rollers on which said carriage is supported and which project beneath girders secured to the pontoon and means for securing a floating vessel to said carriage, as set forth.

6. The combination with a pontoon of a movable carriage, standards fixed to said carriage, movable cross-beams carried by said standards, means for raising and lowering said beams, and rollers on which said carriage is supported and which project beneath girders secured to the pontoon, as set forth.

7. Apparatus for transferring bulk cargoes comprising a pontoon formed with a series of ballast-tanks, means for independently charging and discharging said tanks, a movable carriage secured to said pontoon and adapted to receive the vessel whose cargo is to be transferred, and means for securing the vessel to the carriage, as set forth.

8. Apparatus for transferring bulk cargoes comprising a pontoon formed with a series of ballast-tanks, means for independently charging and discharging said tanks, a movable carriage secured to said pontoon and adapted to receive the vessel whose cargo is to be transferred, means for securing the vessel to the carriage, and means for moving said carriage, as set forth.

9. Apparatus for transferring bulk cargoes comprising a pontoon formed with a series of ballast-tanks, means for independently charging and discharging said tanks, a movable carriage secured to said pontoon and adapted to receive the vessel whose cargo is to be transferred, means for securing the vessel to the carriage, means for transferring the cargo and means for moving said carriage, as set forth.

10. Apparatus for transferring bulk cargoes comprising a pontoon, an elevator carried thereby, a carriage secured to said pontoon, means for securing a vessel to said carriage and means for moving said carriage relatively to said elevator, as set forth.

11. Apparatus for transferring bulk cargoes comprising a pontoon, an elevator carried thereby, a carriage secured to said pontoon, means for securing a vessel to said carriage, means for moving said carriage relatively to said elevator, a series of ballast-tanks and means for independently charging and discharging said tanks, as set forth.

12. Apparatus for transferring bulk cargoes comprising a pontoon, an elevator carried thereby, a carriage secured to said pontoon, means for securing a vessel to said carriage, means for moving said carriage relatively to said elevator, a series of ballast-tanks, a pump the suction-pipe of which is connected to said tanks, inlet-pipes from the sea to said tanks, and means controlling said pipe connections, as set forth.

13. Apparatus for transferring bulk cargoes comprising a pontoon, an elevator carried thereby, a carriage secured to said pontoon, means for securing a vessel to said carriage, means for moving said carriage relatively to said elevator, a series of ballast-tanks, a pump the suction-pipe of which is connected to said tanks, inlet-pipes from the sea to said tanks, means controlling said pipe connections, and motive-power apparatus for driving said elevator and pumps, as set forth.

14. In apparatus for transferring bulk cargoes, the combination of a pontoon, a number of ballast-tanks arranged longitudinally thereof, means for independently charging and discharging said tanks, a movable carriage and means for securing to said carriage the floating vessel whose cargo is to be transferred, substantially as described.

15. The combination with a pontoon having ballast-tanks and means for charging and discharging same, of a longitudinally-movable carriage, means for preventing vertical movement thereof relatively to the pontoon, means for securing a floating vessel thereto, a bucket elevator fixed to said pontoon and means for moving said carriage toward and from said elevator, as set forth.

Signed at 77 Cornhill, London, England, this 29th day of August, 1901.

ALEXANDER WINTON ROBERTSON.

Witnesses:
CHAS. E. DUER,
WM. BRIGHT.